United States Patent [19]
Robb

[11] Patent Number: 5,384,657
[45] Date of Patent: Jan. 24, 1995

[54] LASER BEAM EXPANDERS WITH GLASS AND LIQUID LENS ELEMENTS

[75] Inventor: Paul N. Robb, Santa Clara, Calif.

[73] Assignee: Lockheed Missiles and Space Co., Inc., Sunnyvale, Calif.

[21] Appl. No.: 31,414

[22] Filed: Mar. 15, 1993

Related U.S. Application Data

[63] Continuation-in-part of Ser. No. 11,511, Feb. 1, 1993.

[51] Int. Cl.6 .................................................. G02B 1/06
[52] U.S. Cl. ....................................... 359/665; 372/101
[58] Field of Search .................... 359/665; 372/101, 99

[56] References Cited

U.S. PATENT DOCUMENTS

| | | | |
|---|---|---|---|
| 4,402,574 | 9/1983 | McConnel | 359/666 |
| 4,512,639 | 4/1985 | Roberts et al. | 359/666 |
| 4,526,711 | 7/1985 | Sacher et al. | 359/665 |
| 4,911,538 | 3/1990 | Robb | 359/665 |
| 4,913,535 | 4/1990 | Robb | 359/665 |
| 4,915,483 | 4/1990 | Robb | 359/665 |
| 4,932,762 | 6/1990 | Robb | 359/665 |
| 4,950,041 | 8/1990 | Robb | 359/665 |
| 4,958,919 | 9/1990 | Sigler | 359/665 |
| 4,966,448 | 10/1990 | Robb | 359/665 |
| 5,033,831 | 7/1991 | Sigler | 359/665 |

Primary Examiner—Edward K. Look
Assistant Examiner—Michael S. Lee
Attorney, Agent, or Firm—John J. Morrissey

[57] ABSTRACT

Design forms are disclosed for 5× and 10× laser beam expanders whose lens elements consist of glass and liquid optical materials, which provide diffraction-limited performance without refocussing over a wavelength range from 0.4 micron to 0.8 micron.

4 Claims, 6 Drawing Sheets

FIG_3

0.58756 ———
0.48613 — — —
0.65627 —··—··—
0.43584 —···—···—
0.70652 ————

FIG_4

FIG_7

FIG_8

FIG_9   FIG_10

FIG_11

0.58756 ———
0.48613 — — —
0.65627 —..—..—
0.43584 —...—...—
0.70652 — — — —

FIG_12

LASER BEAM EXPANDERS WITH GLASS AND LIQUID LENS ELEMENTS

This application is a continuation-in-part of U.S. patent application Ser. No. 08/011,551 filed on Feb. 1, 1993.

TECHNICAL FIELD

This invention relates generally to laser beam expanders, and more particularly to high-performance laser beam expanders whose lens elements are made of glass and liquid optical materials.

BACKGROUND ART

In the prior art, the lens elements of laser beam expanders were ordinarily made of optical glasses. In copending U.S. patent application Ser. No. 08/011,551 filed on Feb. 1, 1993, design forms were disclosed for laser beam expanders whose lens elements consist only of plastic and liquid lens elements.

SUMMARY OF THE INVENTION

It is an object of the present invention to provide design forms for laser beam expanders whose lens elements consist of optical glasses and liquids.

It is a more particular object of the present invention to provide design forms for laser beam expanders that achieve substantially diffraction-limited performance over a broad wavelength band using optical glass and liquid lens elements.

It is a specific object of the present invention to provide design forms for laser beam expanders comprising optical glass and liquid lens elements, which exhibit substantially diffraction-limited performance without refocussing over a wavelength range from 0.4 micron to 0.8 micron.

The invention as disclosed herein includes exemplary embodiments of laser beam expanders in which lens elements made of relatively inexpensive optical glasses are used in combination with lens elements made of specified optical-quality liquids of proprietary composition marketed by R. P. Cargille Laboratories, Inc. of Cedar Grove, N.J.

DESCRIPTION OF THE DRAWING

FIG. 7 is a profile drawing of a 10× laser beam expander according to the present invention whose lens elements are made of Schott SF6 glass, Schott SK51 glass and Cargille 642134 liquid.

FIG. 8 is a is a plot of normalized aperture height vs. optical path difference at five different wavelengths for the 10× laser beam expander of FIG. 7.

BEST MODE OF CARRYING OUT THE INVENTION

Figure 1:
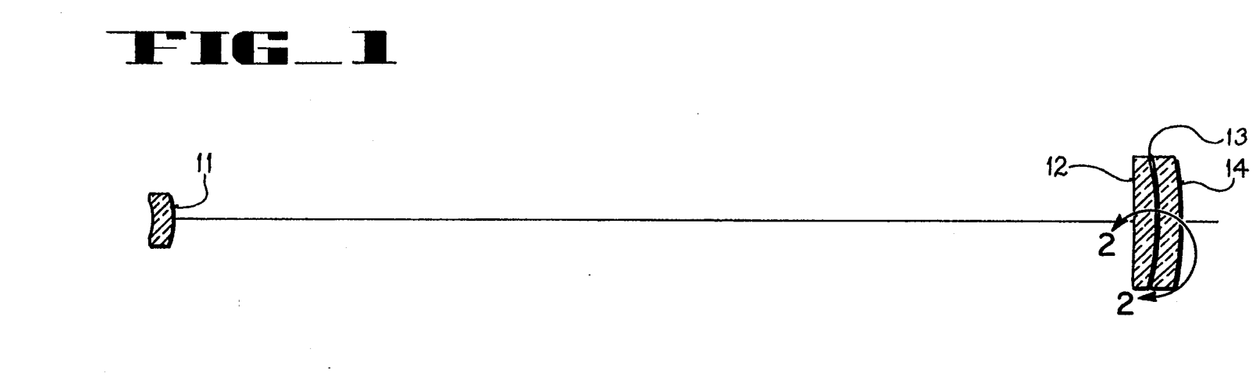
FIG. 1 is a profile drawing of a 5× laser beam expander according to the present invention whose lens elements are made of Schott SF6 glass, Schott SK51 glass and Cargille 642134 liquid.

In FIG. 1, a 5× laser beam expander according to the present invention is illustrated in which four lens elements 11, 12, 13, and 14 are coaxially disposed along an optic axis. The lens elements 11, 12 and 14 are made from commercially available optical glasses; and the lens element 13 consists of an optical liquid of proprietary composition, which is marketed by R. P. Cargille Laboratories, Inc. of Cedar Grove, N.J. The 5× laser beam expander of FIG. 1 has an optical prescription, which is specified in tabular format as follows:

TABLE I

| Surface No. | Radius (mm) | Thickness (mm) | $N_d$ | $V_d$ | Material |
| --- | --- | --- | --- | --- | --- |
| 1 | −8.9456 | 3.0000 | 1.805182 | 25.432 | SF6 |
| 2 | −14.4450 | 140.9780 | | | Air |
| 3 | −182.8981 | 3.0000 | 1.620901 | 60.308 | SK51 |
| 4 | −50.0658 | 0.5000 | 1.640346 | 13.534 | 642134 |
| 5 | −47.5086 | 3.0000 | 1.805182 | 25.432 | SF6 |
| 6 | −65.8340 | 10.0000 | | | Air | where the surfaces of the lens elements are numbered consecutively from left to right along the optic axis in accordance with optical design convention.

In Table I, surfaces No. 1 and No. 2: are the left and right surfaces, respectively, of the lens element 11, which is made of Schott SF6 glass. Surface No. 3 is the left surface of the lens element 12, which is made of Schott SK51 glass. Surface No. 4 is both the right surface of the lens element 12:, and the left surface of the lens element 13. The lens element 13 is made of Cargille 642134 liquid. Surface No. 5 is both the right surface of the lens element 13, and the left surface of the lens element 14. The lens element 14 is made of Schott SF6 glass. Schott SF6 glass and Schott SK51 glass are marketed by Schott Optical Glass, Inc. of Duryea, Pa. Cargille 642134 liquid is marketed by R. P. Cargille Laboratories, Inc. of Cedar Grove, N.J.

The radius listed for each lens surface in Table I is the radius of curvature expressed in millimeters. In accordance with optical design convention, the radius of curvature of a lens surface is positive if the center of curvature of the surface lies to the right of the surface, and negative if the center of curvature of the surface lies to the left of the surface. The thickness listed for each lens surface is the thickness expressed in millimeters of the lens element bounded on the left by the surface. The thickness of each lens element of the 5× laser beam expander shown in FIG. 1 is measured along the optic axis.

The column headed $N_d$ in Table I refers to the index of refraction of the lens element bounded on the left by the indicated surface at the wavelength of the sodium d spectral line (i.e., 0.58756 micron). The column headed $V_d$ refers to the Abbe number for the lens element bounded on the left by the indicated surface.

The material listed for each surface in Table I refers to the type of material bounded on the left by the indicated surface. The "SF6" and "SK51" designations are catalog designations used by the manufacturer, Schott Optical Glass, Inc., to identify particular types of optical glasses. The "642134" designation uniquely identifies a particular liquid in terms of index of refraction and Abbe number according to the U.S. Mil-Spec system. Thus, the "642134" designation indicates a liquid whose index of refraction at the wavelength of the sodium d spectral line (i.e., 0.58756 micron) at a temperature of 25° C. has the value 1.642 to the third decimal place, and whose Abbe number has the value 13.4 to the first decimal place.

The index of refraction of an optical material varies with wavelength. The indices of refraction for the three different materials comprising the lens elements of the 5× laser beam expander of FIG. 1 at five representative wavelengths in the range from 0.4 micron to 0.8 micron (i.e., $N_1$ at 0.58756 micron; $N_2$ at 0.48613 micron; $N_3$ at 0.65627 micron; $N_4$ at 0.43584 micron; and $N_5$ at 0.70652 micron) are tabulated as follows:

TABLE II

| Material | $N_1$ | $N_2$ | $N_3$ | $N_4$ | $N_5$ |
| --- | --- | --- | --- | --- | --- |
| SF6 | 1.805182 | 1.827751 | 1.796090 | 1.847050 | 1.791168 |
| SK51 | 1.620901 | 1.628071 | 1.617775 | 1.633683 | 1.616000 |
| 642134 | 1.640346 | 1.675371 | 1.628057 | 1.712492 | 1.621531 |

Figure 2:
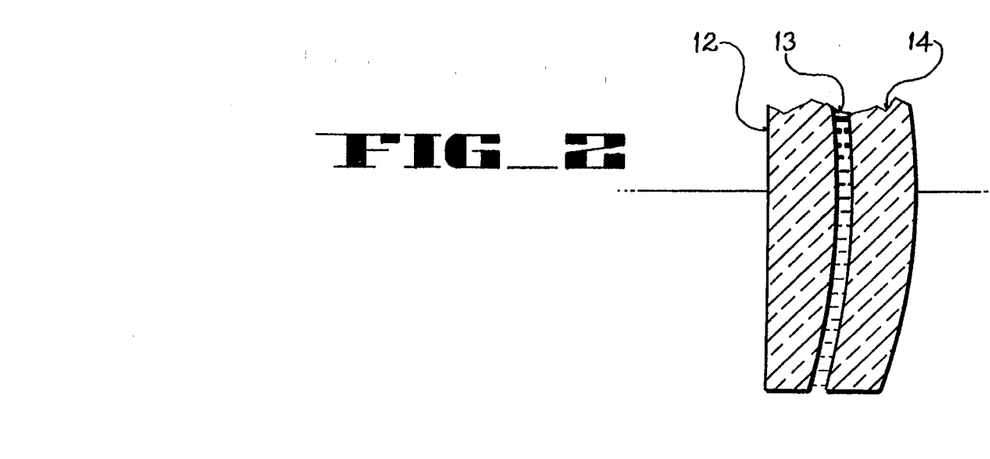
FIG. 2 is a is a plot of normalized aperture height vs. optical path difference at five different wavelengths for the 5× laser beam expander of FIG. 1.

It is instructive to evaluate the performance of the 5× laser beam expander shown in FIG. 1 at each of the above-specified wavelengths. A graphical indication of performance of a lens system at a particular wavelength is provided by a plot of normalized aperture height as a function of optical path difference for that wavelength. In FIG. 2, plots of normalized aperture height as a function of optical path difference are shown for the five wavelengths for which the indices of refraction are specified in Table II. It is apparent from FIG. 2 that the maximum wavefront error for any one of the five plotted wavelengths is less than $\lambda/62$ for the 5× laser beam expander shown in FIG. 1.

The optical path difference (OPD) error of an optical system at a particular wavelength is defined as the difference between the optical path length of a ray traced through a particular location in the entrance pupil of the system at a specified field angle and the optical path length of a reference ray, where the reference ray is usually taken to be the "chief ray" or "principal ray" traced through the center of the pupil at the specified field angle. The wavefront error of an optical system at a particular field angle is calculated as the statistical root-mean-square (RMS) of the optical path differences of a number of rays traced through the system at a single wavelength. A grid of equally spaced rays is generally used; and statistics are accumulated with respect to the point in the image plane where the RMS wavefront error is a minimum for the particular field angle and wavelength.

Figure 3:
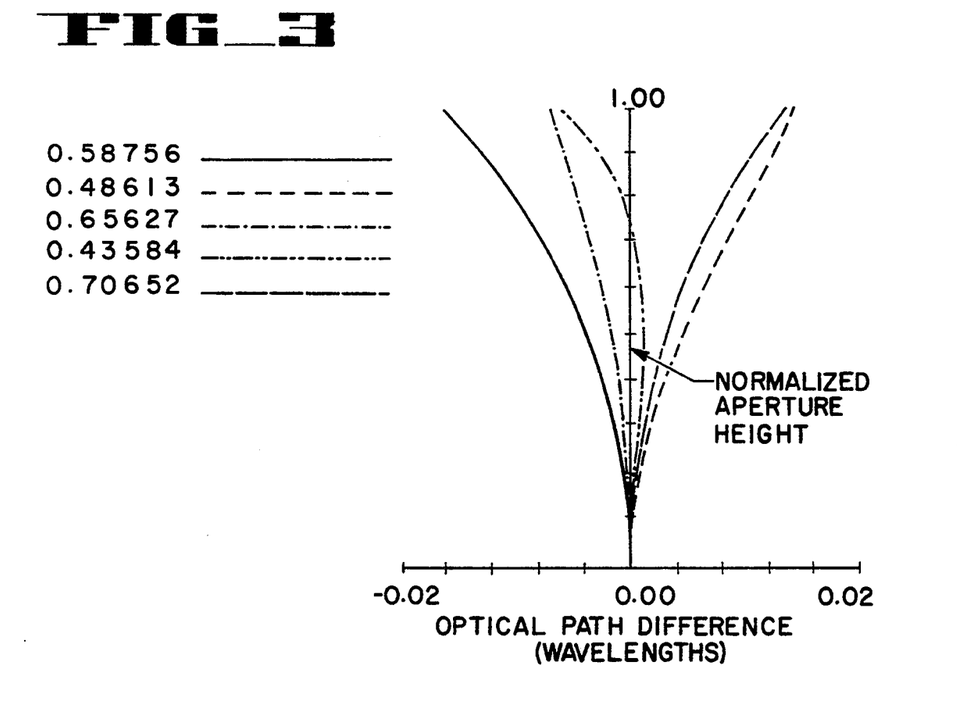
FIG. 3 is a plot of RMS wavefront error vs. wavelength over a wavelength range from 0.4 micron to 0.8 micron for the 5× laser beam expander of FIG. 1.

FIG. 3 is a plot of root-mean-square (RMS) wavefront error versus wavelength for rays entering the 5× laser beam expander of FIG. 1 parallel to the optic axis (i.e., at a field angle of zero) calculated over the wavelength range from 0.4 micron to 0.8 micron. It is apparent from FIG. 3 that the RMS wavefront error of the 5× laser beam expander of FIG. 1 is less than $\lambda/12.2$ between the wavelengths of 0.4 micron and 0.8 micron. The average RMS wavefront error over this wavelength range for the laser beam expander of FIG. 1 is $\lambda/111$.

Figure 4:
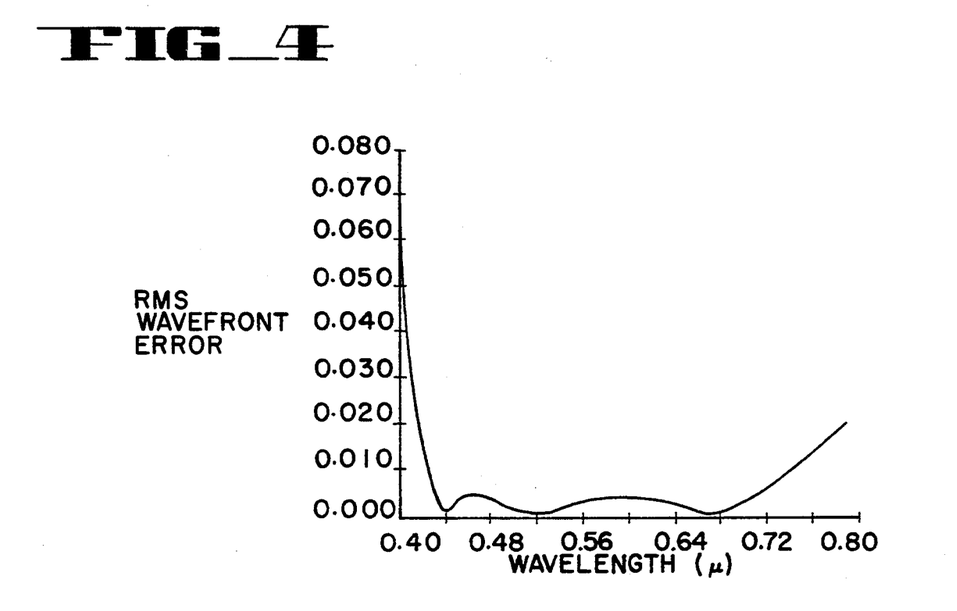
FIG. 4 is a profile drawing of a 5× laser beam expander according to the present invention whose lens elements are made of Schott SF6 glass, Schott BALK1 glass and Cargille 642134 liquid.

In FIG. 4, a second embodiment of a 5× laser beam expander according to the present invention is illustrated in which four lens elements 21, 22, 23, and 24 are coaxially disposed along an optic axis. The 5× laser beam expander of FIG. 4 has an optical prescription, which is specified in tabular format as follows:

TABLE III

| Surface No. | Radius (mm) | Thickness (mm) | $N_d$ | $V_d$ | Material |
| --- | --- | --- | --- | --- | --- |
| 1 | −9.6802 | 3.0000 | 1.805182 | 25.432 | SF6 |
| 2 | −15.6140 | 150.0000 | | | Air |
| 3 | −246.9917 | 3.0000 | 1.526421 | 60.019 | BALK1 |
| 4 | −48.9722 | 0.5000 | 1.640346 | 13.534 | 642134 |
| 5 | −46.5682 | 3.0000 | 1.805182 | 25.432 | SF6 |
| 6 | −63.4703 | 10.0000 | | | Air | where the surfaces of the lens elements are numbered consecutively from left to right along the optic axis in accordance with optical design convention. The radii of curvature, axial thicknesses, and the values of $N_d$ and $V_d$, are specified in the same manner as in Table I.

The indices of refraction for the three different materials comprising the lens elements of the 5× laser beam expander of FIG. 4 at the same five representative wavelengths for which the indices of refraction are specified in Table II are tabulated as follows:

TABLE IV

| Material | $N_1$ | $N_2$ | $N_3$ | $N_4$ | $N_5$ |
| --- | --- | --- | --- | --- | --- |
| SF6 | 1.805182 | 1.827751 | 1.796090 | 1.847050 | 1.791168 |
| BALK1 | 1.526421 | 1.532524 | 1.532753 | 1.537291 | 1.522233 |
| 642134 | 1.640346 | 1.675371 | 1.628057 | 1.712492 | 1.621531 |

Figure 5:
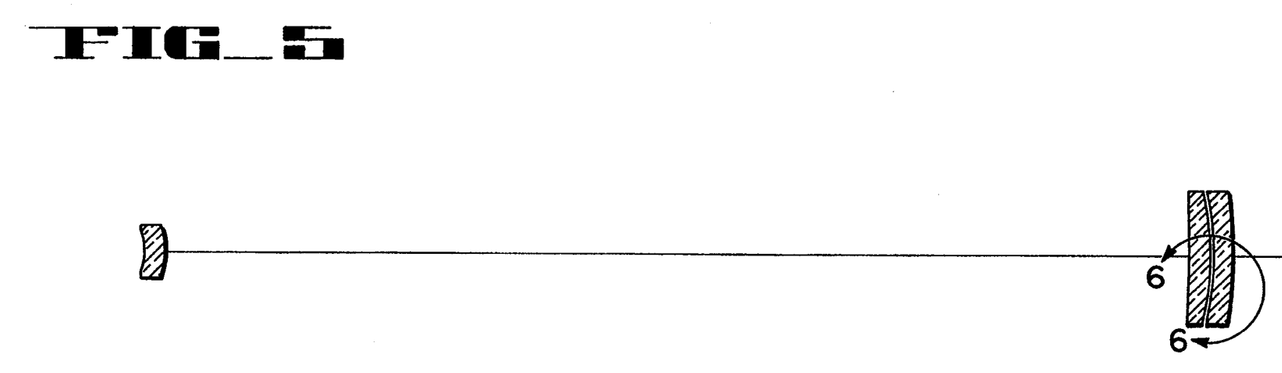
FIG. 5 is a is a plot of normalized aperture height vs. optical path difference at five different wavelengths for the 5× laser beam expander of FIG. 4.

In FIG. 5, plots of normalized aperture height as a function of optical path difference are shown for the 5× laser beam expander of FIG. 4 at the five wavelengths for which the indices of refraction are specified in Table IV. It is apparent from FIG. 5 that the maximum wavefront error at any one of the five plotted wavelengths for the 5× laser beam expander shown in FIG. 4 is less than $\lambda/58$.

Figure 6:
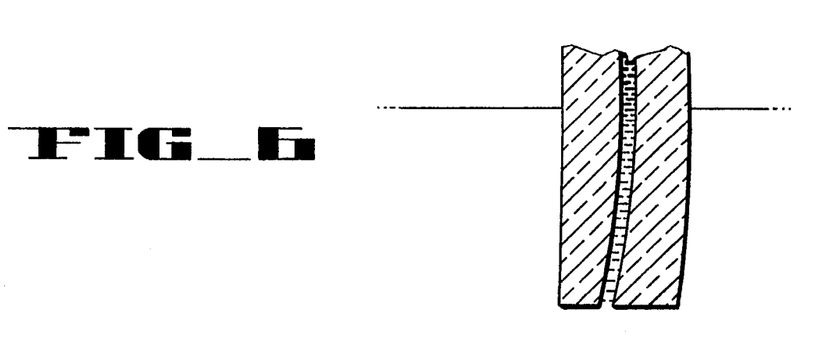
FIG. 6 is a plot of RMS wavefront error vs. wavelength over a wavelength range from 0.4 micron to 0.8 micron for the 5× laser beam expander of FIG. 4.

FIG. 6 is a plot of RMS wavefront error vs. wavelength for rays entering the 5× laser beam expander of FIG. 4 parallel to the optic axis (i.e., at a field angle of zero) calculated over the wavelength range from 0.4 micron to 0.8 micron. It is apparent from FIG. 6 that the wavefront error of the 5× laser beam expander of FIG. 4 is less than $\lambda/12.2$ between the wavelengths of 0.4 micron and 0.8 micron. The average RMS wavefront error over this wavelength range for the 5× laser beam expander of FIG. 4 is $\lambda/109$.

In FIG. 7, a third embodiment of the present invention is illustrated, which is a 10× laser beam expander comprising four coaxially disposed lens elements 31, 32, 33, and 34 made of the same optical materials as the 5× laser beam expander shown in FIG. 1. The 10× laser beam expander of FIG. 7 has an optical prescription, which is specified in tabular format as follows:

TABLE V

| Surface No. | Radius (mm) | Thickness (mm) | $N_d$ | $V_d$ | Material |
|---|---|---|---|---|---|
| 1 | −6.8902 | 3.0000 | 1.805182 | 25.432 | SF6 |
| 2 | −13.3843 | 189.8179 | | | Air |
| 3 | −855.2442 | 3.0000 | 1.620901 | 60.308 | SK51 |
| 4 | −67.5300 | 0.5000 | 1.640346 | 13.534 | 642134 |
| 5 | −62.8071 | 3.0000 | 1.805182 | 25.432 | SF6 |
| 6 | −99.5378 | 10.0000 | | | Air | where the surfaces of the lens elements are numbered consecutively from left to right along the optic axis in accordance with optical design convention. The radii of curvature, axial thicknesses, and the values of $N_d$ and $V_d$, are specified in the same manner as in Table I. The indices of refraction for the three different materials comprising the lens elements of the 10× laser beam expander of FIG. 7 at five representative wavelengths are specified in Table II.

In FIG. 8, plots of normalized aperture height as a function of optical path difference are shown for the 10× laser beam expander of FIG. 7 at the five wavelengths for which the indices of refraction are specified in Table II. It is apparent from FIG. 8 that the maximum wavefront error at any one of the five plotted wavelengths for the 10× laser beam expander shown in FIG. 7 is less than $\lambda/15.5$.

Figure 9:
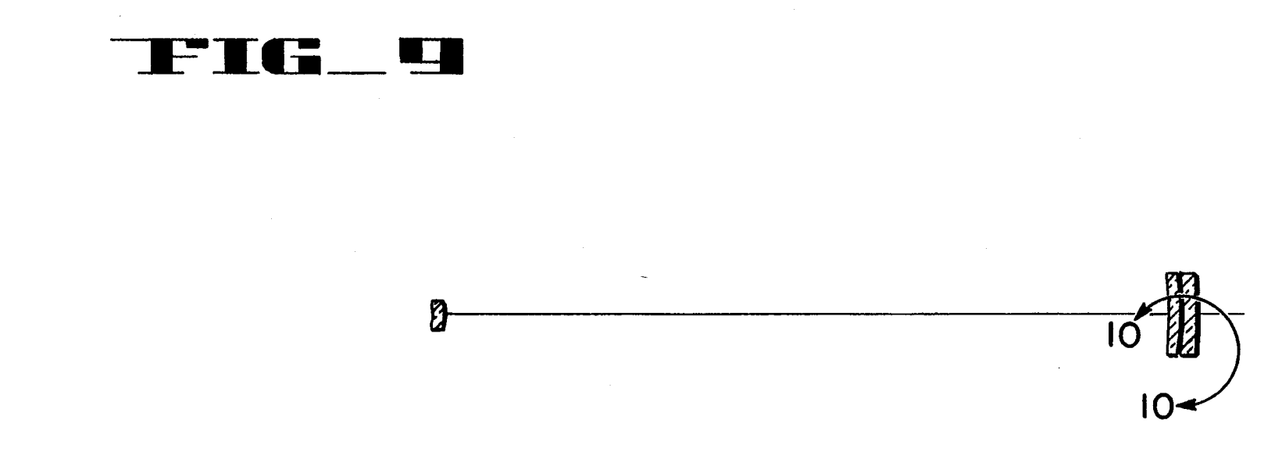
FIG. 9 is a plot of RMS wavefront error vs. wavelength over a wavelength range from 0.4 micron to 0.8 micron for the 10× laser beam expander of FIG. 7.

FIG. 9 is a plot of RMS wavefront error vs. wavelength for rays entering the 10× laser beam expander of FIG. 7 parallel to the optic axis (i.e., at a field angle of zero) calculated over the wavelength range from 0.4 micron to 0.8 micron. It is apparent from FIG. 9 that the wavefront error of the 10× laser beam expander of FIG. 7 is less than $\lambda/3.1$ between the wavelengths of 0.4 micron and 0.8 micron. The average RMS wavefront error over this wavelength range for the 10× laser beam expander of FIG. 7 is $\lambda/27.9$.

Figure 10:
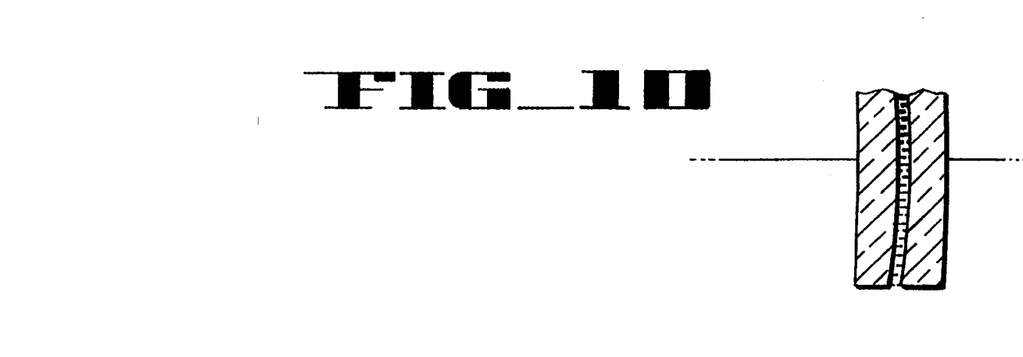
FIG. 10 is a profile drawing of a 10× laser beam expander according to the present invention whose lens elements are made of Schott SF6 glass, Schott BALK1 glass and Cargille 642134 liquid.

In FIG. 10, a fourth embodiment of the present invention is illustrated, which is a 10× laser beam expander comprising four coaxially disposed lens elements 41, 42, 43, and 44 made of the same optical materials as the 5× laser beam expander shown in FIG. 4. The 10× laser beam expander of FIG. 10 has an optical prescription, which is specified in tabular format as follows:

TABLE VI

| Surface No. | Radius (mm) | Thickness (mm) | $N_d$ | $V_d$ | Material |
|---|---|---|---|---|---|
| 1 | −8.8586 | 3.0000 | 1.805182 | 29.432 | SF6 |
| 2 | −19.3052 | 201.4327 | | | Air |
| 3 | 520.5568 | 3.0000 | 1.526421 | 60.019 | BALK1 |
| 4 | −74.6112 | 0.5000 | 1.640346 | 13.534 | 642134 |
| 5 | −68.9276 | 3.0000 | 1.805182 | 25.432 | SF6 |
| 6 | −112.2566 | 10.0000 | | | Air | where the surfaces of the lens elements are numbered consecutively from left to right along the optic axis in accordance with optical design convention. The radii of curvature, axial thicknesses, and the values of $N_d$ and $V_d$, are specified in the same manner as in Table I. The indices of refraction for the three different materials comprising the lens elements of the 10× laser beam expander of FIG. 10 at five representative wavelengths are specified in Table IV.

Figure 11:
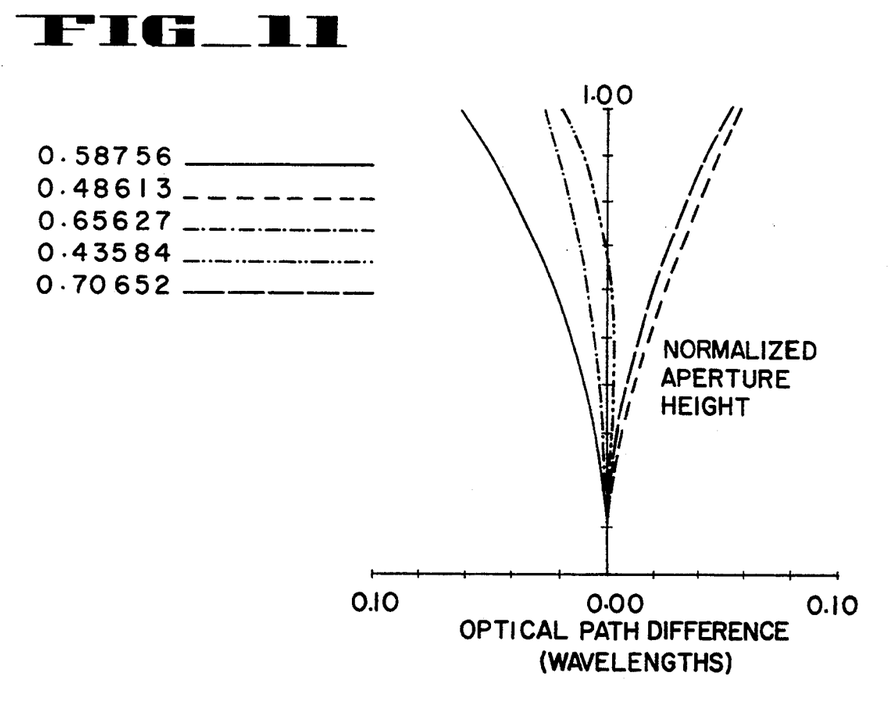
FIG. 11 is a plot of normalized aperture height vs. optical path difference at five different wavelengths for the 10× laser beam expander of FIG. 10.

In FIG. 11, plots of normalized aperture height as a function of optical path difference are shown for the 10× laser beam expander of FIG. 10 at the five wavelengths for which the indices of refraction are specified in Table IV. It is apparent from FIG. 11 that the maximum wavefront error at any one of the five plotted wavelengths for the 10× laser beam expander shown in FIG. 10 is less than $\lambda/15.3$.

Figure 12:
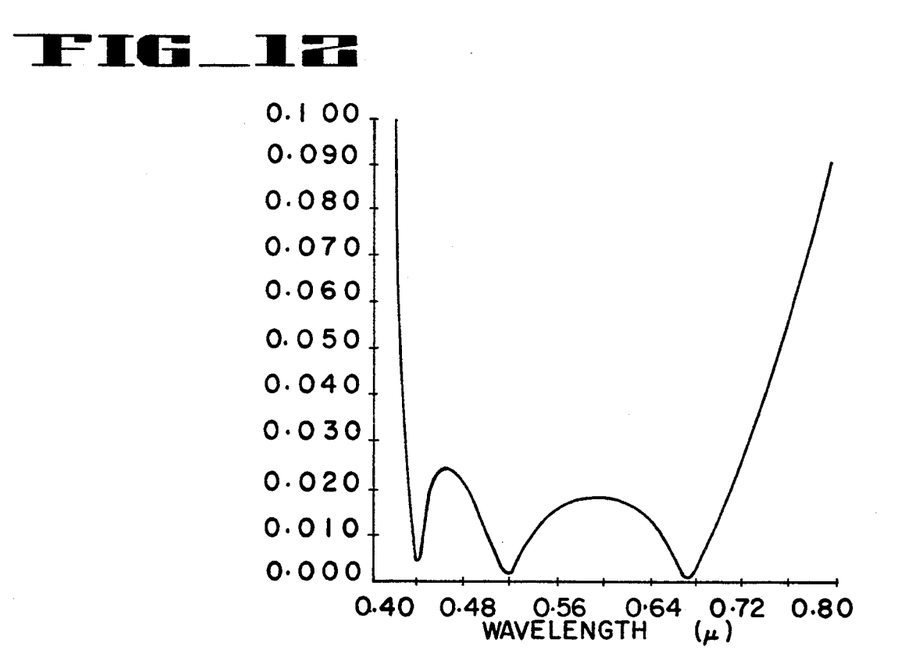
FIG. 12 is a plot of RMS wavefront error vs. wavelength over a wavelength range from 0.4 micron to 0.8 micron for the 10× laser beam expander of FIG. 10.

FIG. 12 is a plot of RMS wavefront error vs. wavelength for rays entering the 10× laser beam expander of FIG. 10 parallel to the optic axis (i.e., at a field angle of zero) calculated over the wavelength range from 0.4 micron to 0.8 micron. It is apparent from FIG. 12 that the wavefront error of the 10× laser beam expander of FIG. 10 is less than $\lambda/3.1$ between the wavelengths of 0.4 micron and 0.8 micron. The average RMS wavefront error over this wavelength range for the 10× laser beam expander of FIG. 10 is $\lambda/27.8$.

The present invention has been described above in terms of certain exemplary design forms, which were developed for particular applications. However, practitioners skilled in the art of optical design could readily develop different design forms for laser beam expanders intended for other applications by changing parametric values of the exemplary design forms and still be within the scope of the invention. Therefore, the present invention is defined more generally by the following claims and their equivalents.

I claim:

1. An afocal lens system having substantially diffraction-limited performance in the visible and near infrared regions of the electromagnetic spectrum, said lens system comprising a plurality of lens elements made of optical glass, and a lens element made of a liquid optical material: said glass lens elements and said liquid lens element being positioned with respect to each other alone an optic axis so that said liquid lens element is disposed between two glass lens elements, said liquid optical material further defined as Cargille 4793790 liquid, said plurality of lens elements further defined as comprising four lens elements, said lens elements being configured and positioned with respect to each other along said optic axis according to a design form specified as follows:

| Surface No. | Radius (mm) | Thickness (mm) | $N_d$ | $V_d$ | Material |
|---|---|---|---|---|---|
| 1 | −8.9456 | 3.0000 | 1.805182 | 25.432 | SF6 |
| 2 | −14.4450 | 140.9780 | | | Air |
| 3 | −182.8981 | 3.0000 | 1.620901 | 60.308 | SK51 |
| 4 | −50.0658 | 0.5000 | 1.640346 | 13.534 | 642134 |
| 5 | −47.5086 | 3.0000 | 1.805182 | 25.432 | SF6 |
| 6 | −65.8340 | 10.0000 | | | Air | where the surfaces of the lens elements are numbered consecutively from left to right along the optic axis, and where $N_d$ is the index of refraction at the wavelength of the sodium d spectral line and $V_d$ is the Abbe number at the same wavelength.

2. An afocal lens system having substantially diffraction-limited performance in the visible and near infrared regions of the electromagnetic spectrum, said lens system comprising a plurality of lens elements made of optical glass and a lens element made of a liquid optical material: said glass lens elements and said liquid lens element being positioned with respect to each other along an optic axis so that said liquid lens element is disposed between two glass lens elements, said liquid optical material further defined as Cargille 4793790 liquid, said plurality of lens elements further defined as comprising four lens elements, said lens elements being configured and positioned with respect to each other along said optic axis according to a design form specified as follows:

| Surface No. | Radius (mm) | Thickness (mm) | $N_d$ | $V_d$ | Material |
|---|---|---|---|---|---|
| 1 | −9.6802 | 3.0000 | 1.805182 | 25.432 | SF6 |
| 2 | −15.6140 | 150.0000 | | | Air |
| 3 | −246.9917 | 3.0000 | 1.526421 | 60.019 | BALK1 |
| 4 | −48.9722 | 0.5000 | 1.640346 | 13.534 | 642134 |
| 5 | −46.5682 | 3.0000 | 1.805182 | 25.432 | SF6 |
| 6 | −63.4703 | 10.0000 | | | Air | where the surfaces of the lens elements are numbered consecutively from left to right along the optic axis, and where $N_d$ is the index of refraction at the wavelength of the sodium d spectral line and $V_d$ is the Abbe number at the same wavelength.

3. An afocal lens system having substantially diffraction-limited performance in the visible and near infrared regions of the electromagnetic spectrum, said lens system comprising a plurality of lens elements made of optical glass, and a lens element made of a liquid optical material: said glass lens elements and said liquid lens element being positioned with respect to each other along an optic axis so that said liquid lens element is disposed between two glass lens elements, said liquid optical material further defined as Cargille 4793790 liquid, said plurality of lens elements further defined as comprising four lens elements, said lens elements being configured and positioned with respect to each other along said optic axis according to a design form specified as follows:

| Surface No. | Radius (mm) | Thickness (mm) | $N_d$ | $V_d$ | Material |
|---|---|---|---|---|---|
| 1 | −6.8902 | 3.0000 | 1.805182 | 25.432 | SF6 |
| 2 | −13.3843 | 189.8179 | | | Air |
| 3 | −855.2442 | 3.0000 | 1.620901 | 60.308 | SK51 |

—continued

| Surface No. | Radius (mm) | Thickness (mm) | $N_d$ | $V_d$ | Material |
|---|---|---|---|---|---|
| 4 | −67.5300 | 0.5000 | 1.640346 | 13.534 | 642134 |
| 5 | −62.8071 | 3.0000 | 1.805182 | 25.432 | SF6 |
| 6 | −99.5378 | 10.0000 | | | Air | where the surfaces of the lens elements are numbered consecutively from left to right along the optic axis, and where $N_d$ is the index of refraction at the wavelength of the sodium d spectral line and $V_d$ is the Abbe number at the same wavelength.

4. An afocal lens system having substantially diffraction-limited performance in the visible and near infrared regions of the electromagnetic spectrum, said lens system comprising a plurality of lens elements made of optical glass, and a lens element made of a liquid optical material: said glass lens elements and said liquid lens element being positioned with respect to each other along an optic axis so that said liquid lens element is disposed between two glass lens elements, said liquid optical material further defined as Camille 4793790 liquid, said plurality of lens elements further defined as comprising four lens elements, said lens elements being configured and positioned with respect to each other along said optic axis according to a design form specified as follows:

| Surface No. | Radius (mm) | Thickness (mm) | $N_d$ | $V_d$ | Material |
|---|---|---|---|---|---|
| 1 | −8.8586 | 3.0000 | 1.805182 | 25.432 | SF6 |
| 2 | −19.3052 | 201.4327 | | | Air |
| 3 | −520.5568 | 3.0000 | 1.526421 | 60.019 | BALK1 |
| 4 | −74.6112 | 0.5000 | 1.640346 | 13.534 | 642134 |
| 5 | −68.9276 | 3.0000 | 1.805182 | 25.432 | SF6 |
| 6 | −112.2566 | 10.0000 | | | Air | where the surfaces of the lens elements are numbered consecutively from left to right along the optic axis, and where $N_d$ is the index of refraction at the wavelength of the sodium d spectral line and $V_d$ is the Abbe number at the same wavelength.

* * * * *